United States Patent [19]

Fitzpatrick et al.

[11] 4,110,072
[45] Aug. 29, 1978

[54] COMPOSITION OF MIXED BENZENSULFONAMIDO ANTHRAQUINONE DYES AND LINEAR POLYESTER MATERIAL DYED THEREWITH

[75] Inventors: Joseph W. Fitzpatrick, Toms River; Arthur D. Olin, Lakewood, both of N.J.

[73] Assignee: Toms River Chemical Corporation, Toms River, N.J.

[21] Appl. No.: 801,706

[22] Filed: May 31, 1977

[51] Int. Cl.² .......................... D06P 1/00; C09B 1/00
[52] U.S. Cl. ............................................ 8/25; 8/39 C; 8/76; 8/179
[58] Field of Search ...................... 8/25, 39 C, 179, 25, 8/76

[56] References Cited
U.S. PATENT DOCUMENTS

| 3,072,683 | 1/1963 | Straley et al. | 8/179 |
| 3,087,773 | 4/1963 | Straley et al. | 8/179 |

*Primary Examiner*—A. Lionel Clegman
*Attorney, Agent, or Firm*—Edward McC. Roberts; Prabodh I. Almaula

[57] ABSTRACT

A composition comprising two or more benzensulfonamido anthraquinone dyes, selected from those of the formula:

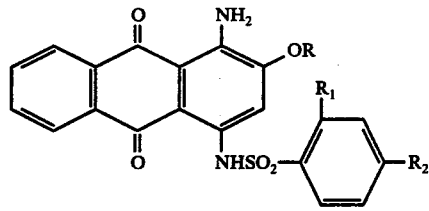

wherein
  R is methyl, ethyl, hydroxyethyl, β-methoxyethyl or β-ethoxyethyl,
  $R_1$ is hydrogen or methyl and
  $R_2$ is hydrogen, methyl or methoxy, provided that in at least one of the selected dyes, $R_1$ and $R_2$ are both hydrogen. The mixture of dyes gives improved dye strength and brightness of shade and is useful for dyeing linear polyester material, particularly textile material, in shades of red, with excellent leveling and fastness properties.

10 Claims, No Drawings

COMPOSITION OF MIXED BENZENSULFONAMIDO ANTHRAQUINONE DYES AND LINEAR POLYESTER MATERIAL DYED THEREWITH

This invention relates to improved mixtures of benzensulfonamido anthraquinone dyes, to the process of dyeing linear polyester material therewith, and to linear polyester material dyed therewith.

The novel and advantageous mixture of dyes comprises two or more benzensulfonamido anthraquinone dyes, selected from those of the formula

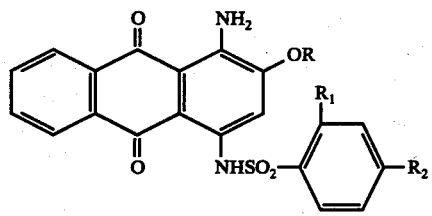

wherein
R is methyl, ethyl, hydroxyethyl, $\beta$-methoxyethyl or $\beta$-ethoxyethyl,
$R_1$ is hydrogen or methyl and
$R_2$ is hydrogen, methyl or methoxy, provided that in at least one of the selected dyes, $R_1$ and $R_2$ are both hydrogen. The effective mixtures include any combination, as above defined, wherein the minor component is present to the extent of at least 10% by weight and the major component is present to the extent of 90% by weight or less. Thus one component may be present to the extent of about 10% to about 50%, and the other component to the extent of about 50% to about 90%.

The dyestuffs of the mixtures of this invention are generally known to the art. U.S. Pat. No. 3,087,773 discloses the family of eligible dyestuffs, except for examples where R is $\beta$-hydroxyethyl, together with methods of synthesis and methods of dyeing for the individual dyestuffs. United States Pat. No. 3,087,773, issued on application of James M. Straley and Ralph R. Giles on Apr. 30, 1963, is here incorporated by reference as part of the instant disclosure. Analogous dyes of the alkylsulfonamide anthraquinones, where R is $\beta$-hydroxyethyl, are disclosed in U.S. Pat. No. 3,072,683 which issued on application of Straley and Giles on Jan. 8, 1963.

Dyes of the above structure are known to commerce where $R_1$ is hydrogen and R and $R_2$ are methyl, alone or in admixture with the dye where $R_2$ is hydrogen and R and $R_1$ are methyl. Both the pure and the mixed commercial dye are found to have markedly improved dyeing properties when mixed with at least 10% by weight of the unsubstituted benzene example of the structure where R is methyl and $R_1$ and $R_2$ are hydrogen.

The dyestuff mixtures of this invention, constituting a dye of the above structure where $R_1$ and $R_2$ are hydrogen as either the major or minor component of the mixture, show improved dyeing strength and brightness of shade over that obtainable by either component used alone. Levelness, crock fastness and wash fastness are found to be equal or superior to that shown by the single component dye.

The dyestuff mixtures of this invention may be prepared by blending the individual dyestuff components, or by synthesis as a mixture.

The invention is illustrated by the following examples.

EXAMPLE 1

1-Amino-4-p-Toluenesulfonamide-2-Anthraquinonesulfonic Acid/1-Amino-4-Benzenesulfonamido-2-Anthraquinonesulfonic Acid A mixture of 77.7 g. of 1-amino-4-bromo-2-anthraquinonesulfonic acid sodium salt, 21.8 g. sodium carbonate, 18.4 g. benzenesulfonamide, 18.4 g. p-toluenesulfonamide, 1 g. cuprous chloride and 2,100 g. water is heated at 95°–100° C for about 8 hours until the reaction is complete. The reaction mass is cooled to 90° C and about 17.5 g. 31% hydrochloric acid added to give a pH of 6-7. The product is then salted out by the addition of 76.5 g. potassium chloride, cooled to 50° C, filtered, and the filter cake washed with about 1,500 g. of a 2% potassium chloride solution. After drying in a 100° C oven there is obtained 100 g. of a voilet powder consisting of a mixture of the potassium salts of 1-amino-4-p-toluenesulfonamido-2-anthraquinonesulfonic acid and 1-amino-4-benzenesulfonamido-2-anthraquinonesulfonic acid.

EXAMPLE 2

1-Amino-2-Methoxy-4-p-Toluenesulfonamidoanthraquinone/
1-Amino-2-Methoxy-4-Benzenesulfonamidoanthraquinone To a homogenous mixture of 225 g. potassium hydroxide in 450 g. methanol cooled to 60°–70° C is added 87 g. of the mixed potassium salts of 1-amino-4-benzenesulfonamido-2-anthraquinonesulfonic acid and 1-amino-4-p-toluenesulfonamido- 2-anthraquinone sulfonic acid. After holding this mixture for about 2 hours at 75°–80° C, the reaction mass is diluted with 750 g. water, filtered at less than 40° C, washed free of alkali with warm and then hot water and the product recovered as a red presscake. There is obtained 65 g. of product calculated on a dry basis, consisting of a mixture which is approximately 48% 1-amino-2-methoxy-4-toluenesulfonamidoanthraquinone and approximately 52% 1-amino-2-methoxy-4-benzenesulfonamidoanthraquinone. The mixture when dispersed in the usual manner dyes polyester textile materials, such as Dacron, red shades which are considerably stronger and brighter than comparable dyeing using dispersions of either of the individual components.

EXAMPLE 3

DYEING METHOD 20.5 parts of the dye mixture of Example 2 was milled with 29.5 parts of sodium lignin sulfonate (or equivalent dispersing agent) in 50 parts of water. The milled slurry was spray dried to give the mixed dye powder, containing 41% mixed dye and 59% sodium lignin sulfonate. 0.3 g. of the mixed dye powder were added to 40 cc. of 40° C water and stirred until wet out. The slurry was diluted to about 150 cc. at 40° C; 0.25 g. ammonium sulfate and 0.4 g. of chlorinated benzene carrier, such as Tanavol (Tanatex Chemical Corp. ) were added. The pH was adjusted to 5 with formic acid and the slurry was transferred to a Gaston County, Model 101 Beaker Dyeing Machine. The slurry volume was adjusted to 250 cc. at 40° C and 5 g. of Dacron type 54 skein was entered.

The temperature was raised to 65° C and the machine pressurized with 5 p.s.i.air. The bath was heated to 130° C in about 35 minutes and held at 130° C for 1 hour. It was cooled to 70° C in 25 minutes.

The dyed skein was rinsed with 60° C water and scoured in a 0.2% soap, 0.1% soda ash solution at 95° C. It was then rinsed with water and dried. The red dyeing was bright and level.

In Examples 1 and 2, similar results are obtained by substituting a mixed o/p-toluenesulfonamide, such as Santicizer 9 (Monsanto), for the p-toluenesulfonamide of Example 1.

Preferred mixtures of this invention are:
(1) 30–70% 1-amino-2-methoxy-4-benzenesulfonamidoanthraquinone
30–70% 1-amino-2-methoxy-4-p-toluenesulfonamidoanthraquinone; and
(2) 30–75% 1-amino-2-methoxy-4-benzenesulfonamidoanthraquinone
15–42% 1-amino-2-methoxy-4-o-toluenesulfonamidoanthraquinone
10–28% 1-amino-2-methoxy-4-p-toluenesulfonamidoanthraquinone.

What is claimed:
1. A dyestuff composition consisting essentially of two or more dyes selected from the group of the formula

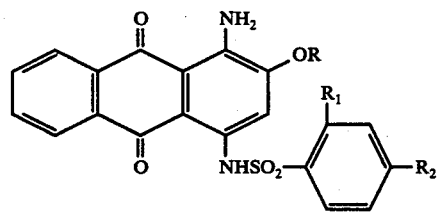

wherein
R is methyl, ethyl, hydroxyethyl, β-methoxyethyl or β-ethoxyethyl,
$R_1$ is hydrogen or methyl and
$R_2$ is hydrogen, methyl or methoxy, provided that $R_1$ and $R_2$ are both hydrogen in one of the elected dyes and provided that the dye present as the minor component is present to the extent of at least about 10% by weight.

2. The dyestuff composition of claim 1, wherein the dye where R is methyl and $R_1$ and $R_2$ are hydrogen and the dye where $R_1$ is hydrogen and R and $R_2$ are methyl are each present to the extent of about 30 to about 70% by weight.

3. The dyestuff composition of claim 1, consisting essentially of:
about 30 to about 75% by weight of the dye where R is methyl and $R_1$ and $R_2$ are hydrogen;
about 15 to about 42% by weight of the dye where $R_2$ is hydrogen and R and $R_1$ are methyl; and
about 10 to about 28% by weight of the dye where $R_1$ is hydrogen and R and $R_2$ are methyl.

4. A process of dyeing linear polyester material comprising the step of applying thereto an aqueous dispersion of a mixture of two or more dyes selected from the group of the formula

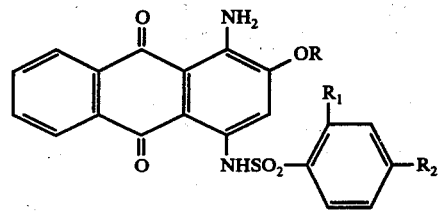

wherein
R is methyl, ethyl, hydroxyethyl, β-methoxyethyl or β-ethoxyethyl,
$R_1$ is hydrogen or methyl and
$R_2$ is hydrogen, methyl or methoxy, provided that $R_1$ and $R_2$ are both hydrogen in one of the elected dyes and provided that the dye present as the minor component is present to the extent of at least about 10% by weight.

5. Linear polyester material dyed with a mixture of two or more dyes selected from the group of the formula

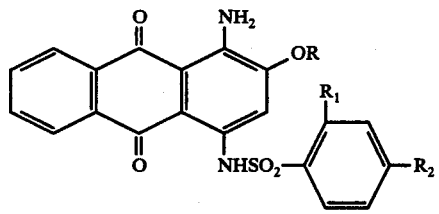

wherein
R is methyl, ethyl, hydroxyethyl, β-methoxyethyl or β-ethoxyethyl,
$R_1$ is hydrogen or methyl and
$R_2$ is hydrogen, methyl or methoxy, provided that $R_1$ and $R_2$ are both hydrogen in one of the elected dyes and provided that the dye present as the minor component is present to the extent of at least about 10% by weight.

6. The linear polyester material of claim 5, wherein the dye where R is methyl and $R_1$ and $R_2$ are hydrogen and the dye where $R_1$ is hydrogen and R and $R_2$ are methyl are each present to the extent of about 30 to about 70% by weight.

7. The linear polyester material of claim 5, wherein
about 30 to about 75% by weight of the dye where R is methyl and $R_1$ and $R_2$ are hydrogen;
about 15 to about 42% by weight of the dye where $R_2$ is hydrogen and R and $R_1$ are methyl; and
about 10 to about 28% by weight of the dye where $R_1$ is hydrogen R and $R_2$ are methyl; are present.

8. The dyestuff composition of claim 1, further containing a dispersing agent.

9. The dyestuff composition of claim 8, wherein the composition is about 40% dyes and about 60% dispersing agent.

10. The dyestuff composition of claim 9, wherein the dispersing agent is sodium lignin sulfonate.

* * * * *